Oct. 10, 1961   A. P. McCARTHY   3,003,822
AUTOMATIC EMERGENCY BRAKE SYSTEM
Filed April 11, 1960
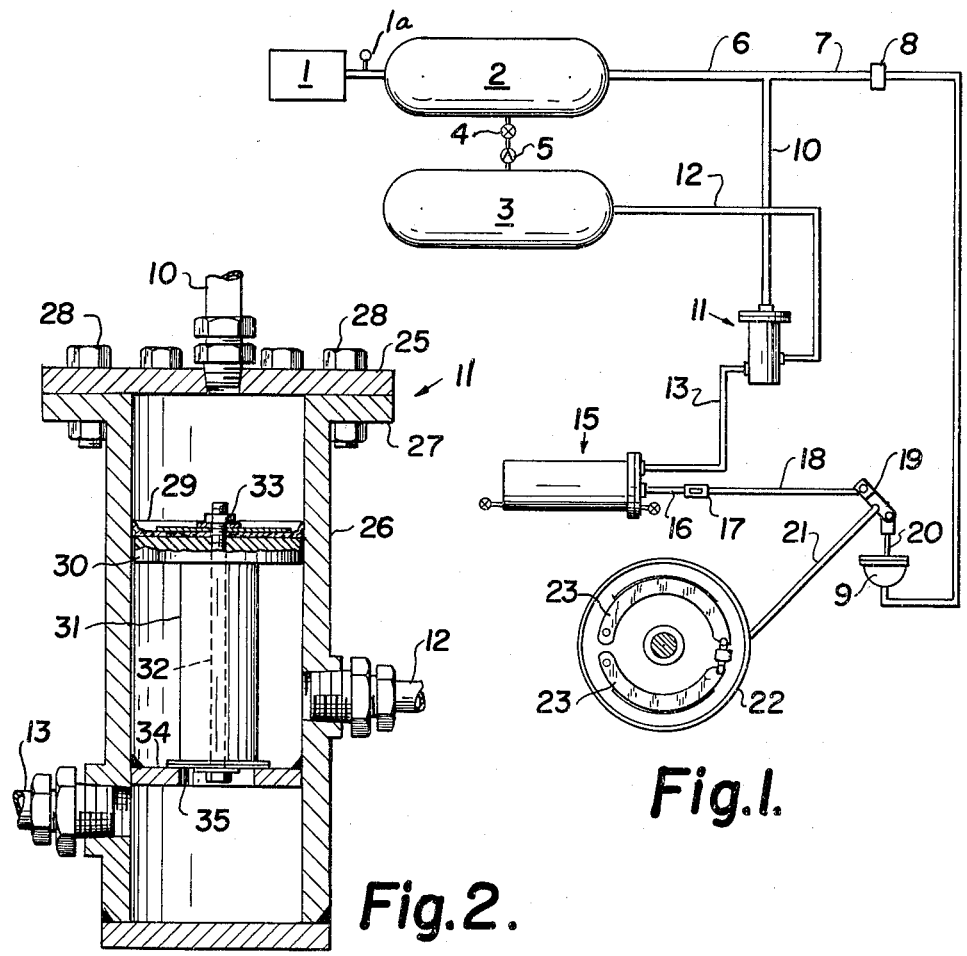
Fig.1.
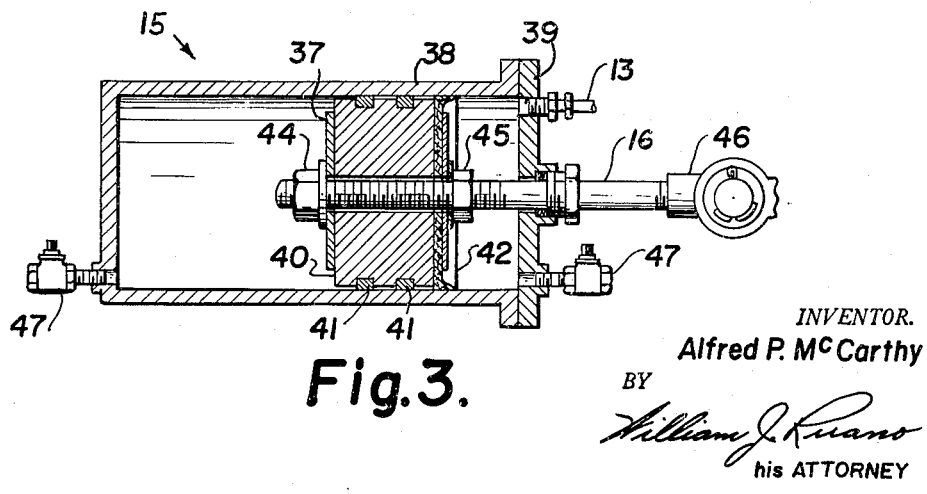
Fig.2.
Fig.3.
INVENTOR.
Alfred P. McCarthy
BY
William J. Ruano
his ATTORNEY 3,003,822
AUTOMATIC EMERGENCY BRAKE SYSTEM
Alfred P. McCarthy, 603 Mountain St., Pittsburgh 10, Pa.
Filed Apr. 11, 1960, Ser. No. 21,562
2 Claims. (Cl. 303—9)

This invention relates to an automatic emergency brake system for vehicles such as trucks, buses and the like and, more particularly, to a pneumatic, safety stop system for vehicles having pneumatically operated brakes to prevent the possibility of the vehicle running wild or out of control in the event of breakage of the air line or failure of air pressure in such line.

There have been numerous instances of trucks and other vehicles running wild and causing serious accidents, many fatal, because of failure of the brakes. Numerous attempts have been made to prevent this by providing various automatic braking systems, however these attempts have not met with success as will be evident from the fact that there are still numerous reported cases of trucks running wild as a consequence of failure of the air brake system.

An object of my invention is to provide a novel emergency air braking system which is devoid of the above named disadvantages and which is positive and reliable in operation and which assures immediate application of the brakes in the event of either brakage in the main air line or abnormal reduction of air pressure in such line for any reason whatsoever.

A more specific object of my invention is to provide an auxiliary air or pneumatically operated emergency braking system which will come into operation automatically as the result of failure or abnormal decrease of air pressure in the main air tank or line.

Other objects and advantages will become apparent from a study of the following description taken with the accompanying drawing wherein:

FIG. 1 is a schematic diagram showing an automatic emergency air brake system embodying the principles of my invention;

FIG. 2 is an enlarged, cross-sectional view of the pilot operating valve 11 shown in FIG. 1; and FIG. 3 is an enlarged cross-sectional view of the emergency brake cylinder 15 shown in FIG. 1.

Referring more particularly to FIG. 1 of the drawing, numeral 1 denotes an air compressor which, through a safety valve 1a, furnishes air under pressure of the order of 125 lbs. per square inch to a main air receiver or tank 2. The main air receiver 2 is connected, by means of a pressure reducing valve 4 and a check valve 5, to an auxiliary air receiver or tank 3 in which the air pressure is less than that of receiver 2, that is, of the order of 100 lbs. per square inch.

Air from the auxiliary air tank 3 passes through an auxiliary air line 12 to a pilot operating valve 11, shown in more detail in FIG. 2. However, since the main air receiver 2 is also connected by pipe 10 to such pilot operating valve, the valve will normally be in the closed position shown in FIG. 2 because of the greater air pressure above the top of the piston 30 than below it. Therefore, air from the auxiliary receiver 3 does not pass through the pilot operating valve 11 during normal operation of the brakes.

Normally, air under pressure from the main air receiver 2 flows through pipes 6 and 7 and through a foot brake operating valve 8, whereupon when the brake pedal is applied it will open valve 8 whereby air under pressure will be admitted to the brake operating diaphragm 9 which, in turn, will lift the brake operating rod 20 so as to rotate the cam shaft and thereby apply the brake by expanding the brake shoe 23 against the brake drum 22 in a well known manner. It will be understood, of course, that while only one brake is shown, connected to tank 2, for purposes of simplicity, there are actually two or four brakes connected thereto together with their associated brake operating diaphragm 9 and links 19.

Let us assume that either there is an abnormal failure of pressure in the main air receiver 2 or that a brake occurs in the line comprising lines 6 and 7 and diaphragm 9. In this case, pressure at the top of the pilot operating valve 11, that is, the pressure introduced by pipe 10 into the valve 11 above piston 30 will become lower rather than higher than the pressure below piston 30, in communication with the pipe 12 which is fed by the 100 lbs. pressure of the auxiliary receiver 3, therefore will lift piston 30 and open the valve to provide intercommunication between pipes 12 and 13.

The pilot operating valve 11 consists essentially of a valve body 26 having a circular flange 27 on which rests a cover plate 25 which is bolted thereto by means of bolts 28. A pilot piston rod 31 is provided having an axially extending opening through which a bolt 32 is passed having, at one end thereof, a nut 33 screwed thereon so as to firmly hold, by means of a plate and lock washer, a leather sealing cup 29 which forms an air-tight seal with the inner walls of the cylinder. At the bottom of the piston rod 31 there is mounted a washer 35 which is adapted to seat on a seat 34, as shown in FIG. 2 to normally close communication between the pipes 12 and 13 since there is 150 lbs. air pressure above piston 30 and only 100 lbs. below it. However, when the pressure above the piston 30 and sealing cup 29 becomes less than the pressure below it by virtue of either air failure or leakage or abnormal decrease of pressure in the main line to below 100 lbs., piston 30 will rise under the force of the 100 lbs. pressure underneath thereof so as to open air communication between pipes 12 and 13, whereupon air under pressure of about 100 lbs. from auxilary air receiver 3 will flow through the operating valve 11 to pipe 13 and into the emergency brake cylinder 15, whose construction is shown in more detail in FIG. 3.

As will be noted in FIG. 3, the emergency brake cylinder 15 comprises a cylinder 38 having a cover or end plate 39 fastened thereon and enclosing a piston 40 having piston rings 41 thereon for sealing engagement with the inner walls of the cylinder. Piston rod 16 is fastened to the piston by means of nuts 44 and 45 and is connected to a sleeve 46 connected to turnbuckle 17. At the bottom of the cylinder there are bleeder or drainage valves 47.

Thus when air under pressure is admitted from pipe 13 into the right side of cylinder 38 it will cause the piston 40 to move to the left, as viewed in FIG. 3, so as to pull on rod 16 and sleeve 46 which are connected to the adjustable turnbuckle 17 and emergency brake cable 18, which is somewhat flexible, thereby turning the eccentric 19 counter clockwise about the axis of the cam shaft 21, thereby applying the brake. In view of the flexibility of cable 18, normal operation of the brakes by the main cylinder 2 will not cause corresponding movement of the emergency operating rod 16 and piston 40, the cable, instead, merely flexing.

While the emergency brake cylinder will vary in dimensions, depending on the particular vehicle, in a typical case, it may have a length of 8 inches, an inner diameter of 2½ inches, a thickness of 3/16 inch and tensile strength of 55,000 lbs. with a bursting pressure of 9,000 lbs. per square inch. Of course, these dimensions can be varied considerably to suit different applications.

Thus it will be seen that I have provided an efficient, reliable and fool proof automatic air braking system for vehicles which will insure quick and automatic application of the brakes as a result of leakage of air pressure from the main tank or main air supply line, and which braking is effected by air under reduced pressure from an auxiliary air tank or receiver to insure adequate force to effect quick stoppage of the vehicle, thereby avoiding loss of control or running wild thereof.

While I have illustrated and described a single specific embodiment of my invention, it will be understood that this is by way of illustration only, and that various changes and modifications may be made within the contemplation of my invention and within the scope of the following claims.

I claim:

1. In an air braking system for vehicles comprising a main tank enclosing air under pressure, a main air supply line fed thereby, brake operating means including a diaphragm motor operated by air from said supply line, in combination, an auxiliary air containing tank, a pressure reducing valve connected between said tanks so as to provide reduced pressure in said auxiliary tank, a pilot operating valve including a piston, one side of said piston being in communication with said main tank and the other side, with said auxiliary tank, said pilot operating valve being normally closed by virtue of the greater pressure of said main tank, and an emergency brake cylinder including a piston which is also connected to said brake operating means, said last named cylinder being in communication with said pilot operating valve in a manner so that when air under said reduced pressure is passed through said pilot operating valve so as to flow into said emergency brake cylinder as a consequence of abnormal decrease of pressure in said main tank, it will operate the piston of the emergency brake cylinder and effect operation of said brake operating means.

2. An air braking system as recited in claim 1, wherein said brake operating means comprises a brake operating rod connected to the diaphragm motor, a rotatable link having one end connected to said rod, a brake operating cam shaft connected to an intermediate portion of said link so as to be rotated thereby, and a flexible cable connected to the other end of said link and to said emergency brake piston, whereby the brakes are applied selectively either by air under pressure in said diaphragm motor or by air under pressure in said emergency brake cylinder, and whereby said cable will flex and therefore not operate said emergency brake piston as the result of operation of said diaphragm motor.

References Cited in the file of this patent

UNITED STATES PATENTS

| | | |
|---|---|---|
| 512,233 | Speed | Jan. 2, 1894 |
| 2,512,043 | Stevens | June 20, 1950 |
| 2,781,870 | Clements | Feb. 19, 1957 |
| 2,862,583 | Granche | Dec. 2, 1958 |
| 2,871,066 | Pannier et al. | Jan. 27, 1959 |